US005159350A

United States Patent [19]

Minaminaka

[11] Patent Number: 5,159,350

[45] Date of Patent: Oct. 27, 1992

[54] TAPE PRINTING APPARATUS

[75] Inventor: Kazuyoshi Minaminaka, Suzuka, Japan

[73] Assignee: Brother Kogyo Kabushiki Kaisha, Nagoya, Japan

[21] Appl. No.: 604,248

[22] Filed: Oct. 29, 1990

[30] Foreign Application Priority Data

Oct. 31, 1989 [JP] Japan .................................. 1-283489

[51] Int. Cl.[5] .............................................. G01D 15/10

[52] U.S. Cl. ................................. 346/76 PH; 346/24; 400/621

[58] Field of Search .............. 346/76 PH, 24; 400/621

[56] References Cited

U.S. PATENT DOCUMENTS 3,566,022 2/1971 Bishop .................................. 346/24
3,585,289 6/1971 Huber .................................... 346/24
4,752,786 6/1988 Inoue et al. ..................... 346/76 PH
4,830,522 5/1989 Sato et al. ........................... 400/621
4,967,285 10/1990 Tabuchi ................................ 346/24

FOREIGN PATENT DOCUMENTS 0312201 4/1989 European Pat. Off. .
0314517 5/1989 European Pat. Off. .
0315369 5/1989 European Pat. Off. .
0319209 6/1989 European Pat. Off. .
58-90971 8/1983 Japan .
61-143163 11/1986 Japan .
61-152469 11/1986 Japan .
0205264 8/1988 Japan .................................. 400/621

*Primary Examiner*—Benjamin R. Fuller
*Assistant Examiner*—Huan Tran
*Attorney, Agent, or Firm*—Jones, Tullar & Cooper

[57] ABSTRACT

Ink on an ink tape is melted and transferred onto a print tape by a thermal print head, while an electric motor is driven to feed the print tape. When the number of rotations of the motor reaches a predetermined value, a controller judges that the lead print position of the tape has reached a cutter and stops rotating the motor. At this time, operating the cutter can cut away a blank area preceding the lead print position. Continuing the printing without operating the cutter can eliminate blank areas between the multiple printed portions.

11 Claims, 6 Drawing Sheets

E
S15
STOR MOTOR
DISPLAY "TAPE CUT"
S16
INPUT KEY
S17
PRINT KEY ?
NO
YES
S18
FLAG OFF
F

C
S4
MODE SWITCH KEY ?
YES
NO
S5
FLAG ON
S6
STORE AND DISPLAY DATA
B

D
S12
FLAG ON ?
NO
YES
S13
(REQIRED STEP NUMBER)
-(ACTUAL STEP NUMBER)
RPTATE ACCORDING TO DIFFERENCE
S14
A

TAPE PRINTING APPARATUS

BACKGROUND OF THE INVENTION

1. Field of the Invention

The present invention generally relates to a tape printing apparatus. More particularly, the present invention relates to a printing apparatus capable of printing on a print tape and then automatically cutting the tape with as little blank area as possible.

2. Description of the Related Art

Printing devices for printing characters, symbols, etc. on print tape are generally known. According to this type of printing apparatus, a print tape 100 is held together with an ink tape 101 between a thermal print head 102 and a platen roller 103, as shown in FIG. 5. Ink coated on the surface of the ink tape 101 is melted and transferred onto the print tape 100 by the thermal print head 102.

The print tape 100 having undergone this thermal transfer process is separated from the ink tape 101, and is adhered to a double-sided adhesive tape 106 by means of a drive roller 104 and a driven roller 105. The drive roller 104 is driven by a stepping motor incorporated in the printing apparatus. The print tape 100 is fed to an outlet 107 by roller 104. It is then cut to the desired length by an operator. The cut piece is to be stuck on the back cover of a file or the like.

When the next segment of the print tape 100 is printed, the printing starts from a position facing the thermal print head 102, not from the cut position. This yields a blank, unprinted area 108 between the cut position and the position facing the thermal print head 102, as shown in FIG. 4A.

Therefore, after cutting the printed tape 100, the operator often must further cut away the blank area 108 from the cut piece using scissors or the like as shown in FIG. 4B, making the cutting work time consuming and troublesome.

SUMMARY OF THE INVENTION

It is therefore a primary object of the present invention to provide a printing apparatus capable of cutting a print tape at the proper position without requiring a later manual trimming step to eliminate the unprinted portion of the printed label.

It is another object of the present invention to provide a printing apparatus capable of stopping a print tape at the proper cutting position after printing the desired characters on the tape, based on the operation of an input apparatus, thus ensuring high reliability.

It is still another object of the present invention to provide a printing apparatus which requires no manual operation other than at the time of providing an input and cutting a print tape, and is therefore easy to use.

To achieve the above objects, according to the present invention, there is provided a printing apparatus comprising a print tape and a printing means for printing on the print tape at a predetermined print position. This printing apparatus further comprises a tape feeding means for feeding the print tape in a predetermined direction, a cutting means for cutting the print tape at a tape cutting position, and a stop means for stopping the tape feeding means when a print start portion of the print tape comes immediately before the tape cutting position.

BRIEF DESCRIPTION OF THE DRAWINGS

The features of the present invention that are believed to be novel are set forth with particularly in the appended claims. The invention, together with the objects and advantages thereof, may best be understood by reference to the following description of the presently preferred embodiment together with the accompanying drawings of which:

FIG. 1(*b*) is an explanatory diagram showing storage sectors of the ROM shown in FIG. 1(*a*);

FIG. 1(*c*) is an explanatory diagram showing storage sectors of the RAM shown in FIG. 1(*a*);

DETAILED DESCRIPTION OF THE PREFERRED EMBODIMENT

Figure 1:
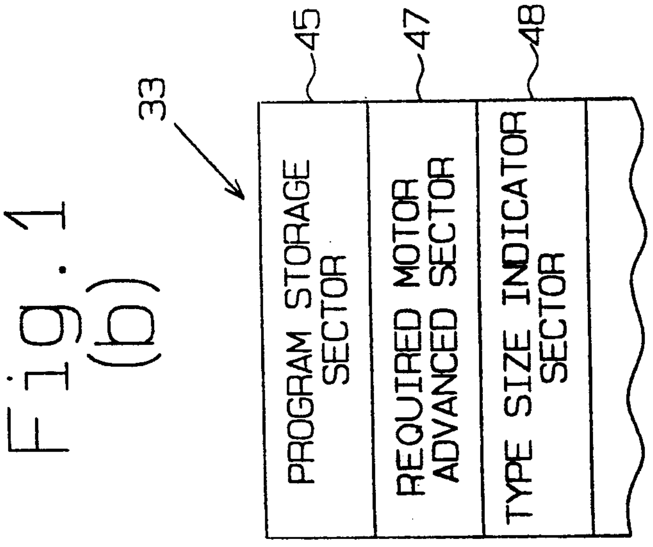
Figure 1:
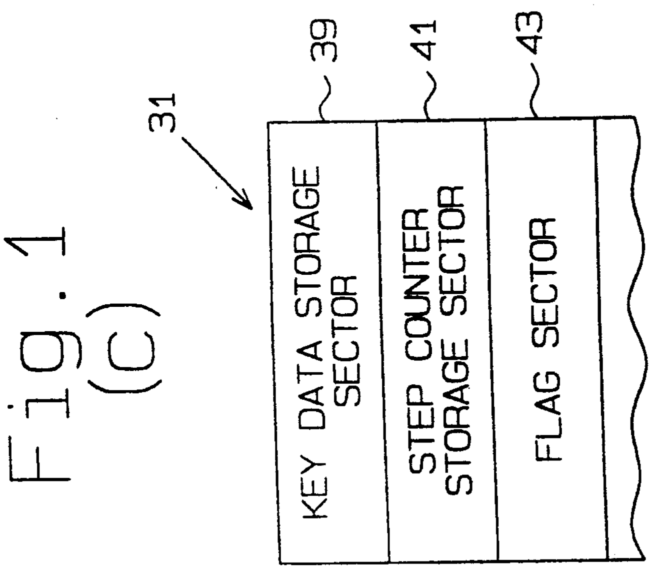
Figure 2:
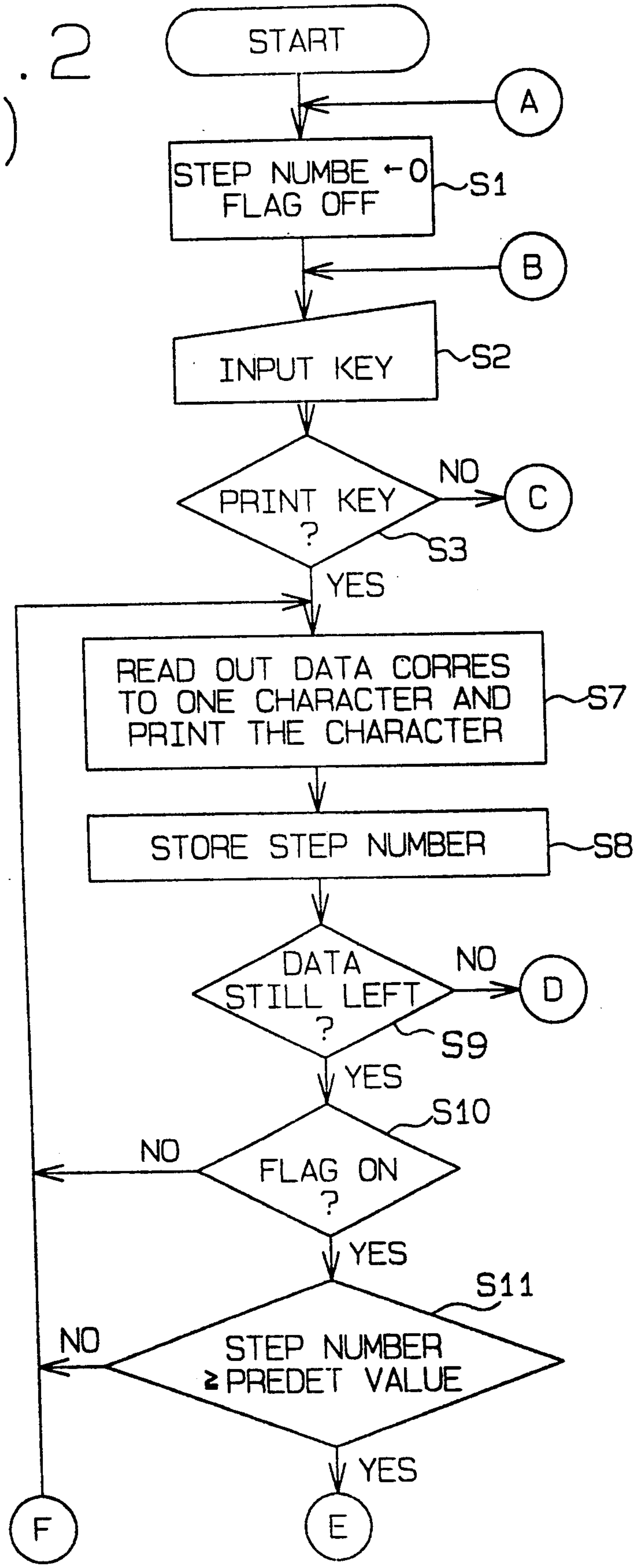
FIGS. 2(*a*) to 2(*d*) are flow charts illustrating a continuous operation of the CPU shown in FIG. 1(*a*)
Figure 2:
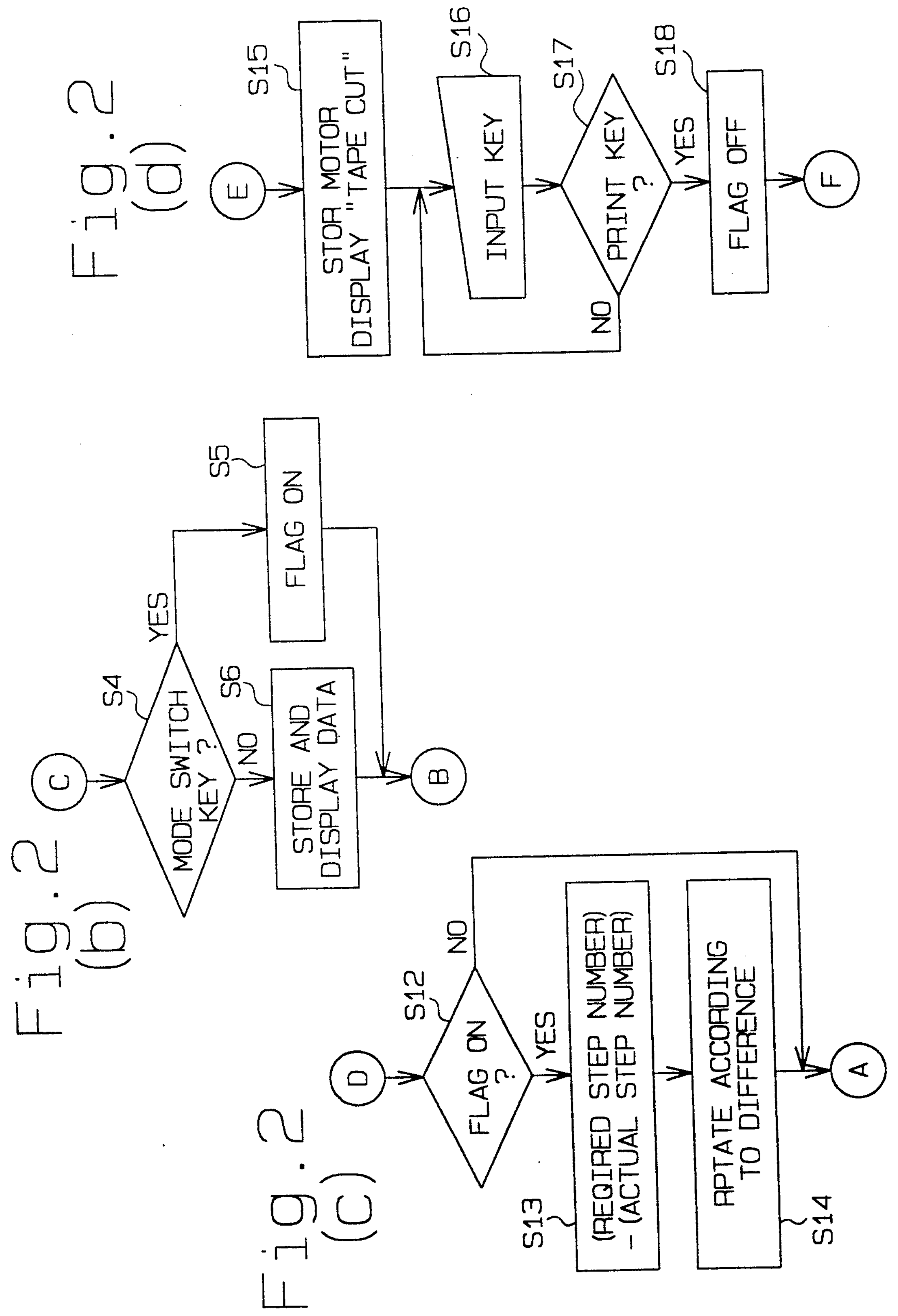

A preferred embodiment of the present invention will now be described referring mainly to FIGS. 1 through 3.

Figure 3:
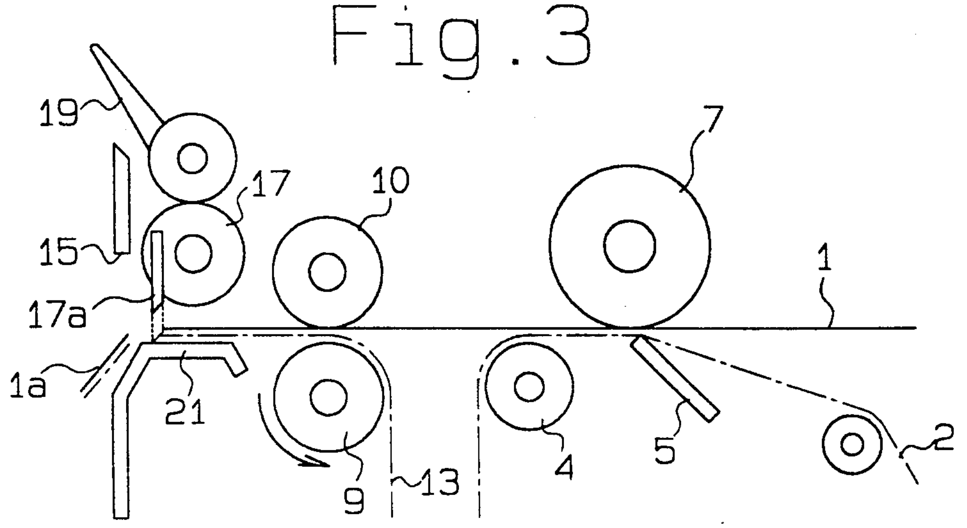
FIG. 3 is a schematic side view showing the mechanical arrangement of the printing apparatus of the present invention.
Figure 4:
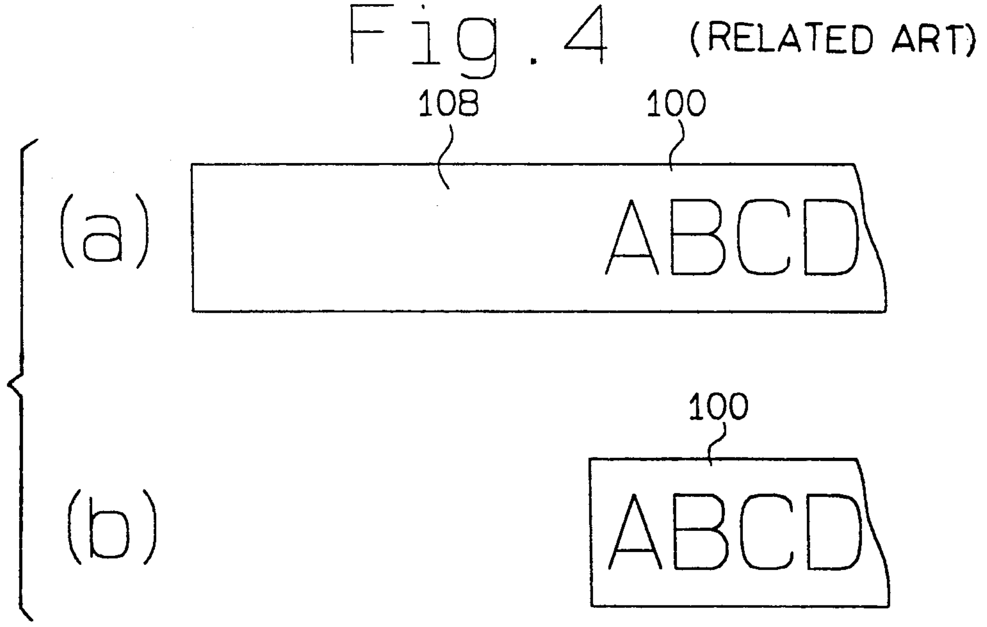
Fig. 4 (RELATED ART)
FIGS. 4(*a*) and 4(*b*) are diagrams respectively showing the status of a print tape before and after the tape is cut with scissors according to the prior art.
Figure 5:
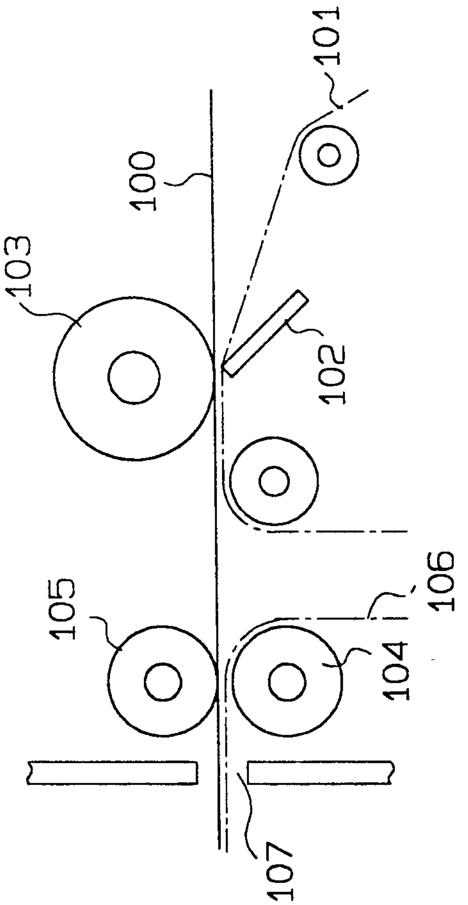
Fig. 5 (RELATED ART)
FIG. 5 is a schematic side view illustrating the mechanical arrangement of a conventional printing apparatus.

When printing starts in the frame of a printing apparatus shown in FIG. 3, a print tape 1 is held together with ink-coated ink tape 2 between a thermal print head 5 and a platen roller, as they move toward an outlet 15. The ink on the ink tape 2 is thermally melted and transferred onto the print tape 1 by the thermal print head 5, forming characters, symbols, or the like. (hereinafter simply referred to as "characters"). The ink tape 2 is then guided toward a winding roller (not shown) via a guide roller 4, separated from the print tape 1.

Then, the print tape 1 and an adhesive tape 13 are held between a drive roller 9 and a driven roller 10, so that the latter type 13 is adhered with pressure to the back of the former tape 1. This adhesive tape 13 has an adhesive coated on both sides, with a thin sheet of paper stuck separable on one side. The exposed adhesive is to be adhered to the print tape 1. The adhesive is pressure-adhering to permit easy adhesion to the print tape 1.

The drive roller 9 is driven by a motor 30 (FIG. 1) to feed the print tape towards the outlet 15. The drive motor rotates the drive roller by a predetermined amount for each character printed on the print tape 1.

A cutter 17 is positioned in the feed path of print tape 1 a fixed distance away from the print portion of the thermal print head 5. The fixed distance is set to be an integer multiple of a character space printed on the print tape 1. The cutter 17 is rotatably mounted and is rotated by manual operation of a lever 19. The lever interlocks with the cutter 17, moving its cutting edge 17*a* downward when the lever is operated.

When a desired number of characters are printed on the print tape 1, the drive roller 9 feeds the print tape 1 so that the last printed character extends just beyond the cutter 17. The print tape is then stopped. Operating the lever 19 then causes the cutter edge 17*a* to cut the print tape 1, providing a label 1a. This label 1a may then be used in any conventional manner.

The electric controller for this embodiment will now be discussed referring to FIG. 1(a). A keyboard 25 has many keys including alphanumeric keys 35 for entering data, a print key 37 for entering print command data, and a mode switch key 38 for inputting data to set a tape cutting mode. Various types of data are input to a controller 22 in accordance with the operation of these keys 35, 37 and 38.

The controller 22 comprises a central processing unit (CPU) 23, a read only memory (ROM) 33 for storing a control program for the CPU 23, and a random access memory (RAM) 31 for temporarily storing the results of arithmetic operations done by the CPU 23.

FIG. 1(b) presents a diagram for explaining the storage sectors of the ROM 33. In a program storage sector 45 a control program of the CPU 23 is stored. Data indicative of the number of steps of the motor 30 (the number of rotations of the drive roller 9) required to feed the print tape 1 directly below the cutter edge 17a from the thermal print head 5 is stored in a required motor advance sector. A type size indicator sector 48, stores data about the number of steps of the motor 30 required to print each character width. This includes the character width data for normal characters, wide characters and the like.

FIG. 1(c) illustrates various storage sectors of the RAM 31. A key data storage sector 39 stores data entered through the keyboard 25. A step counter storage sector 41 stores data about the number of rotations that the motor 30 is actually driven, i.e., the number of steps. In a flag sector 43, a print flag is set in accordance with the operation of the mode switch key 38.

Figure 1A:
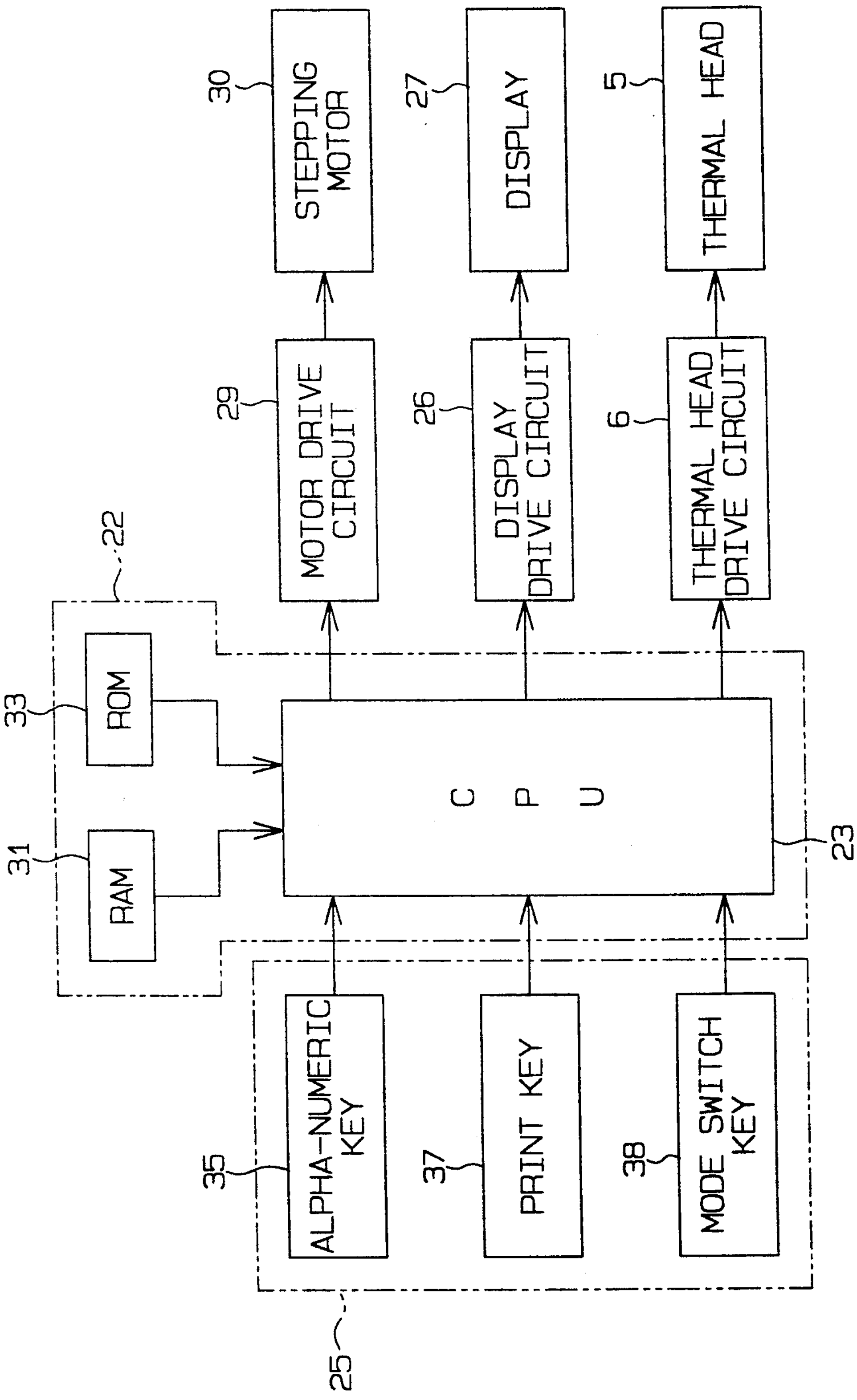
FIG. 1(*a*) is a block circuit diagram illustrating the electronic layout of a printing apparatus embodying the present invention.

As shown in FIG. 1(a), the CPU 23 causes a display drive circuit 26 to display data entered through the keyboard 25 and various messages from the printing apparatus side on a display 27. By way of example the display may take the form of a CRT.

The CPU 23 reads the program and data from the program storage sector 45 and type size indicator sector of the ROM 33 based on various input commands from the alphanumeric keys 35, print key 37, etc. on the keyboard 25. According to the read-out program and data, the CPU 23 controls the driving of the motor 30 via a motor drive circuit 29. The rotation of the drive roller 9 is therefore controlled to execute different tape feeding to print various characters.

The CPU 23 also causes a print head drive circuit 6 to drive the thermal print head 5 to print characters in accordance with the input signal from the print key 38 based on the command signal from the alphanumeric keys 35.

Referring to FIGS. 2(a) to 2(d), the operation of the CPU will be explained below. At the beginning of the printing, the cut edge of the print tape 1 lies below the cutter edge 17a and the tape 1 lies on a path between the rollers 9 and 10 and the thermal print head 5 and the roller 7. In this state, no printing is done on that portion of the print tape 1 which is between the thermal print head 5 and the cutter edge 17a.

In step 1 (each step being simply denoted by "S" in the Figures), the CPU 23 sets the initial value of "0" as the number of steps in the step counter storage sector 41, and initializes the flag of the flag sector 43 to OFF. When the keyboard 25 is operated in the subsequent step 2, the CPU 23 determines whether or not the key input is originated from the operation of the print key 37 in step 3. If the decision is NO, the flow advances to step 4.

In this step 4, the CPU 23 determines whether or not the key input has been made by the operation of the mode switch key 38. If the decision is YES, the CPU 23 goes to step 5 where it sets the flag of the flag sector 43 in the RAM 31 to ON before returning to step 2.

If the key input has been generated by an alphanumeric key 35, however, the CPU 23 moves to step 6 through steps 2 to 4. In step 6, the CPU 23 stores character data corresponding to the operated alphanumeric key 35 in the key data storage sector in the RAM 31 at a predetermined position, and causes the display 27 to display this character data, then returning to step 2.

When the operation of the alphanumeric keys 35 continues, the CPU 23 repeats the process sequence of steps 2, 3, 4 and 6, and plural pieces of character data corresponding to the keys 35 in the operated seqence are sequentially stored in the key data storage sector 39.

If the key operated in step 2 has been the print key 37, the CPU 23 advances to step 7 through step 3. In step 7, the CPU 23 reads out those pieces of the character data stored in the key data storage sector which have not yet been printed, character by character, and drives the thermal print head 5 to print according to the data of each single character.

In the next step 8, the CPU 23 adds the number of rotational steps of the motor 30 required for tape feeding to print the single character data to the value stored in the step counter storage sector 41. In other words, the quantity of printed characters is stored as the number of rotational steps of the motor driven from the beginning of the printing in the step counter storage sector 41.

Subsequently, when unprinted data remains in the key data storage sector 39 in step 9 and the flag is OFF in step 10 (which is the case of the mode switch key 38 unoperated at the printing time), the CPU 23 returns to step 7 and repeats the sequence of steps 7 to 10 until it determines in step 9 that every character data has been printed.

When the mode switch key 38 has been operated, in which case the flag is set to ON (YES in step 10), the CPU 23 goes to step 11 where it compares the actual number of steps accumulated in the step counter storage sector 41 in the RAM 31 with a predetermined number of steps stored in the required motor advance sector 47 in the ROM 33. If the actual number of steps is smaller than the predetermined number (when the head character printed on the print tape 1 has not come immediately before the cutter edge 17a), the CPU 23 returns to step 7 from step 11 and repeats the sequence of steps 7 to 11 to continue feeding the tape 1.

When all data has been printed before the motor 30 rotates the predetermined number of steps (when the total width size of the characters desired to be printed is not equal to the distance between the thermal print head 5 and the cutter edge 17a), the CPU 23 moves to step 12 from step 9. If the flag set in the flag sector 43 is ON in step 12, the CPU 23 substracts the actual number of steps from the predetermined number of steps of the motor 30 in step 13, and rotates the motor 30 by the number of steps corresponding to the result of the subtraction. As a result, the print tape 1 is fed so that the head character thereon comes immediately before the cutter 17. When the operator manipulates the lever 19 then, the blank area preceding the head character on the print tape 1 can be cut away.

When the number of characters input through the alphanumeric keys 35 is large enough that the total width size of the input characters exceeds the interval between the thermal print head 5 and the cutter edge 17*a*. there remains uprinted data even after the motor 30 rotates the predetermined number of steps. In this case, the CPU 23 determines in step 11 that the actual number of rotational steps of the motor 30 has exceeded the predetermined number of rotational steps, then stops the printing operation of the thermal print head 5 as well as the motor 30, and displays a message to suggest tape cutting on the display 27 in step 15. When the head character on the print tape 1 comes before the cutter edge 17*a*, the printing operation of the thermal print head 5 is inhibited, so that the operator can cut the print tape 1 before the head character by manipulating the lever 19 to remove the blank area.

Since the distance between the printing portion of the thermal print head 5 and the cutter edge 17*a* is set to an integer multiple of the width of a character as described above, interruption of tape feeding immediately before the cutter edge 17*a* is executed where printing of a single character has been completed. When the print key 37 is operated again in step 16 and this event is detected in step 17, the CPU 23 sets the flag in the flag sector 43 to OFF in step 18, then returning to step 7. When printing of the remaining print data is completed through the sequence of steps 7 to 9 and it is detected in step 9 that no further data to be printed remains, the CPU 23 moves to step 12. As the flag is OFF (YES in step 12), the operation returns to step 1.

When the mode switch key 38 has not been operated, in which case the flag of the flag sector 43 is always set to OFF, the CPU 23 repeats the sequence of steps 7 to 10, then returns through step 12 to step 1.

As tape feeding is interrupted after printing on the print tape 1 is done, then the next printing is executed, as described above, the feeding of the tape 1 is temporarily stopped before the head character for the subsequent printing comes directly under the cutter edge 17*a*. This feature permits the cutter edge 17*a* to cut the print tape 1 between the end of the previously printed character and the first one of the characters to be printed next. To continuously execute a plurality of printing operations, the print tape 1 can be effectively used without making a blank area preceding the first or head character to be printed at each printing operation.

Although only one embodiment of the present invention has been described herein, it should be apparent to those skilled in the art that the present invention may be embodied in many other specific forms without departing from the spirit or scope of the invention as recited in the appended claims.

What is claimed is:

1. A tape printing apparatus, comprising:

a print tape arranged so as to run in a predetermined path;

printing means including a thermal print head, provided on one side of the predetermined path, for printing on the print tape at a predetermined print position;

tape feeding means for feeding the print tape along the predetermined path at a time of printing on the print tape, said tape feeding means including a feed roller rotatable in synchronism with an operation of the thermal print head to feed the print tape, and an electric motor for driving the feed roller;

cutting means for cutting the print tape at a tape cutting position spaced away from the print position; and stop means for stopping the tape feeding means when a print start portion of the print tape comes immediately before the tape cutting position, wherein:

said stop means comprises a controller, the electric motor and the thermal print head being synchronously driven by said controller; and said controller stores an actual number of rotations of the electric motor and a predetermined number of rotations of the electric motor required to feed the print tape to the tape cutting position from the print position, compares the actual number of rotations stored with the predetermined number of rotations stored and stops the electric motor based on a result of the comparison.

2. A tape printing apparatus according to claim 1, wherein the printing means includes:

an ink tape coated with ink; and a thermal print head for causing the ink tape to contact the print tape, melting the ink on the ink tape, and transferring the melted ink onto the print tape.

3. A tape printing apparatus according to claim 1, wherein the controller is connected with an input device comprising:

a character input member for entering characters and symbols to be printed on the print tape;

a print instructing member for directing printing by the thermal print head; and a tape-cut mode setting member for instructing the electric motor to stop rotating when the print start portion of the print tape reaches the tape cutting position.

4. A tape printing apparatus according to claim 3, wherein the controller comprises:

a central processing unit;

a first storage means for storing key input data from the character input member, the actual number of rotations of the electric motor and an input from the tape-cut mode setting member; and a second storage means for storing a predetermined number of rotations of the electric motor, a predetermined number of steps of the electric motor during operation of the thermal print head in response to a single key input from the character input member, and a control program of the central processing unit.

5. A tape printing apparatus according to claim 4, wherein based on an instruction from the print instructing member, the controler drives the thermal print head to execute printing in accordance with the key input data stored in the first storage means, and forcibly drives the electric motor after printing all of the key input data, the electric motor being driven by a number of steps determined by subtracting an actual number of steps of the electric motor from the predetermined number of steps of the electric motor.

6. A tape printing apparatus according to claim 4, wherein the controller drives the thermal print head to execute printing in accordance with the key input data stored in the first storage means based on an instruction from the print instructing member, and stops the electric motor when the actual number of steps of the electric motor exceeds the predetermined number of steps of the electric motor before all of the key input data is printed.

7. A tape printing apparatus according to claim 3, further comprising a display driven under control of the controller, for displaying input data from the input device and various types of print data.

8. A tape printing apparatus, comprising:

a print tape arranged so as to run in a predetermined path;

printing means including a thermal print head, provided on one side of the predetermined path, for printing on the print tape at a print position;

tape feeding means for feeding the print tape along the predetermined path in synchronism with the printing means at a time of printing on the print tape;

cutting means for cutting the print tape at a tape cutting position spaced away from the print position; and stop means for stopping the tape feeding means when a print start portion of the print tape comes immediately before the tape cutting position, wherein:

said printing means includes an ink tape coated with ink and the thermal print head for causing the ink tape to contact the print tape, melting the ink on the ink tape, and transferring the melted ink onto the print tape, said tape feeding means includes a feed roller rotatable in synchronism with an operation of the thermal print head to feed the print tape, and an electric motor for driving the feed roller;

said electric motor and the thermal print head being synchronously driven by a controller;

said controller stores an actual number of rotations of the electric motor and a predetermined number of rotations of the electric motor required to feed the print tape to the tape cutting position from the print position, compares the actual number of rotations stored with the predetermined number of rotations stored, and stopping the electric motor based on a result of the comparison;

said controller being connected with an input device having a character input member for entering characters and symbols to be printed on the print tape, a print instructing member for directing printing by the thermal print head and a tape-cut mode setting member for instructing the electric motor to stop rotating when the print start portion of the print tape reaches the tape cutting position; and said controller including a central processing unit, a first storage means for storing key input data from the character input member, the actual number of rotations the electric motor and an input from the tape-cut mode setting member and a second storage means for storing a predetermined number of rotations of the electric motor, a predetermined number of steps of the electric motor during operation of the thermal print head in response to a single key input from the character input member, and a control program of the central processing unit.

9. A tape printing apparatus according to claim 8, wherein the controller drives the thermal print head to execute printing in accordance with the key input data stored in the first storage means based on an instruction from the print instructing member, and the controller drives the electric motor after printing of all key input data by a number of steps acquired by subtracting an actual number of steps of the electric motor from the predetermined number of steps of the electric motor.

10. A tape printing apparatus according to claim 8, wherein the controller drives the thermal print head to execute printing in accordance with the key input data stored in the first storage means based on an instruction from the print instructing member, and the controller stops the electric motor when the actual number of steps of the electric motor exceeds the predetermined number of steps of the electric motor before printing of all key input data.

11. A tape printing apparatus, comprising:

a print tape arranged so as to run in a predetermined path;

an ink tape provided so as to run on one side of the predetermined path, the ink tape being coated with ink;

a thermal print head for causing the ink tape to contact the print tape, melting some ink on the ink tape, and transferring the melted ink onto the print tape;

an input device including a character input member for entering characters and symbols to be printed on the print tape, a print instructing member for directing printing by the thermal print head, and a tape-cut mode setting member for instructing the print tape to stop running when a print start portion of the print tape reaches a tape cutting position spaced away from a print position;

an electric motor, drivable in synchronism with the thermal print head at a time of printing on the print tape, for feeding the print tape in a predetermined direction;

a cutter for cutting the print tape at the tape cutting position;

a controller having, a first storage means for storing key input data from the character input member, an actual number of rotations of the electric motor and an input from the tape-cut mode setting member, and a second storage means for storing a predetermined number of rotations of the electric motor, a required number of steps of the electric motor during operation of the thermal print head in response to a single key input from the character input member, the controller being arranged for reading the stored data of the first and second storage means as needed, driving the thermal print head to execute printing in accordance with the key input data stored in the first storage means based on an instruction from the print instructing member, driving the electric motor after printing of all key input data by a number of steps acquired by subtracting an actual number of steps of the electric motor from a predetermined number of steps of the electric motor, and stopping rotation of the electric motor when the actual number of steps of the electric motor exceeds the predetermined number of steps of the electric motor before printing of all key input data; and a display driven under control of the controller, for displaying input data from the input device and various types of print data.

* * * * *